United States Patent
Elizov et al.

(10) Patent No.: US 9,619,329 B2
(45) Date of Patent: Apr. 11, 2017

(54) CONVERTING VOLATILE MEMORY MODULE DEVICES TO FLASHLESS NON-VOLATILE MEMORY MODULE DEVICES

(71) Applicant: International Business Machines Corporation, Armonk, NY (US)

(72) Inventors: Ofir Elizov, Even Yehuda (IL); Mudi M. Fluman, Haifa (IL); Yaacov Frank, Ramot Meir (IL); Yehuda Shiran, Haifa (IL); Ronny Vatelmacher, Hod-Hashron (IL)

(73) Assignee: International Business Machines Corporation, Armonk, NY (US)

( * ) Notice: Subject to any disclaimer, the term of this patent is extended or adjusted under 35 U.S.C. 154(b) by 102 days.

(21) Appl. No.: 14/745,502

(22) Filed: Jun. 22, 2015

(65) Prior Publication Data
US 2016/0371148 A1    Dec. 22, 2016

(51) Int. Cl.
| | | |
|---|---|---|
| *G06F 11/14* | (2006.01) | |
| *G06F 12/06* | (2006.01) | |
| *G06F 11/07* | (2006.01) | |

(52) U.S. Cl.
CPC ........ *G06F 11/1435* (2013.01); *G06F 11/073* (2013.01); *G06F 11/0727* (2013.01);
(Continued)

(58) Field of Classification Search
CPC ............. G06F 11/1441; G06F 11/0727; G06F 11/073; G06F 12/0638
See application file for complete search history.

(56) References Cited

U.S. PATENT DOCUMENTS 5,386,541 A * 1/1995 Moridaira ................. G06F 8/65
  235/492
6,332,197 B1 * 12/2001 Jadav .................. G06F 11/1076
  714/6.1
(Continued)

FOREIGN PATENT DOCUMENTS

EP        0614143 A2      9/1994

OTHER PUBLICATIONS

Huang et al., "Design and implementation of Flash based NVDIMM", Windawn Technology, 18 Zhenze Road WuXi China 21400, pp. 1-6, 978-1-4799-5576-3/14/$31.00, © 2014 IEEE.

*Primary Examiner* — Yolanda L Wilson
(74) *Attorney, Agent, or Firm* — Noah A. Sharkan; Brian M. Restauro

(57) ABSTRACT

Embodiments of the present invention provide an apparatus and methods for converting a volatile memory module device to a non-volatile memory module device. In one embodiment, a male contact edge of a memory module device is inserted to a first memory module device socket of a memory module device adaptor, the memory module device adaptor having a first male contact edge. Power is provided to the memory module device in the event of a system failure. Diodes operatively connected to one or more power pins of the first memory module device socket prevent current from flowing to the battery to one or more power pins of the male contact edge of the memory module device adaptor. Applications needing dedicated memory are registered and, in the event of a system failure memory module device data associated with the registered applications can be recovered without the use of flash memory.

20 Claims, 7 Drawing Sheets

(52) U.S. Cl.
CPC ...... *G06F 11/1441* (2013.01); *G06F 12/0638* (2013.01); *G06F 2212/205* (2013.01)

(56) References Cited

U.S. PATENT DOCUMENTS

| | | |
|---|---|---|
| 7,830,732 B2 * | 11/2010 | Moshayedi .............. G11C 5/04 365/189.17 |
| 8,009,499 B2 | 8/2011 | Reuter et al. |
| 8,694,721 B2 | 4/2014 | Haywood |
| 8,719,492 B1 | 5/2014 | Asnaashari |
| 8,767,463 B2 | 7/2014 | Amidi et al. |
| 8,874,831 B2 | 10/2014 | Lee et al. |
| 2007/0168699 A1 * | 7/2007 | Nellitheertha ...... G06F 11/1441 714/5.11 |
| 2009/0292861 A1 * | 11/2009 | Kanevsky ............... G06F 3/061 711/103 |
| 2010/0088477 A1 * | 4/2010 | Katsumata .......... G06F 12/0284 711/153 |
| 2010/0205348 A1 * | 8/2010 | Moshayedi .............. G11C 5/14 711/102 |
| 2012/0131253 A1 * | 5/2012 | McKnight ................. G06F 1/30 710/308 |
| 2014/0310451 A1 * | 10/2014 | Lee ....................... G06F 3/0605 711/105 |
| 2014/0325116 A1 | 10/2014 | McKelvie et al. |

\* cited by examiner

CONVERTING VOLATILE MEMORY MODULE DEVICES TO FLASHLESS NON-VOLATILE MEMORY MODULE DEVICES

BACKGROUND OF THE INVENTION

The present invention relates generally to the field of memory modules, and more particularly to memory module devices.

Computer memory generally refers to any physical device that is capable of storing information temporarily or permanently. Typically, memory can either be volatile (i.e., loses its content when the device loses power) or non-volatile (i.e., retains its contents even if power is lost). Examples of volatile memory include memory module devices such as Single In-Line Memory Modules (SIMM) and Dual In-Line Memory Modules (DIMM). In cases of unexpected power loss, data residing in either volatile memory module device are lost and cannot be recovered.

SUMMARY

In one embodiment of the present invention, an apparatus is provided. The apparatus includes a memory module device adaptor having a first memory module device socket and a first male contact edge, wherein the first memory module device socket is configured to receive a male contact edge of a memory module device, and the first male contact edge is configured to be inserted into a second memory module device socket. The apparatus further includes a battery operatively connected to one or more power pins of the first memory module device socket, wherein the battery is configured to provide power to a memory module device received in the first memory module device socket. The apparatus further includes one or more diodes operatively connected to the one or more power pins of the first memory module device socket and one or more power pins of the first male contact edge, wherein the one or more diodes are configured to prevent current from flowing from the battery to the one or more power pins of the first male contact edge.

In another embodiment of the present invention, a method is provided. The method includes inserting a male contact edge of a memory module device into a first memory module device socket of a memory module device adaptor, the memory module device adaptor having a first male contact edge. The method further includes inserting a male contact edge of the memory module device adaptor into a second memory module device socket. The method further includes providing power from a battery to the memory module device, wherein the battery is operatively connected to one or more power pins of the first memory module device socket. The battery is operatively connected to one or more power pins of the first memory module device socket, and one or more diodes are operatively connected to the one or more power pins of the first memory module device socket and one or more power pins of the male contact edge of the memory module device adaptor to prevent current from flowing from the battery to the one or more power pins of the male contact edge of the memory module device adaptor.

DETAILED DESCRIPTION

Embodiments of the present invention provide solutions for converting a volatile memory module device to a non-volatile memory module device (e.g., volatile DIMM to non-volatile DIMM). Embodiments of the present invention can be used to convert a volatile memory module device to a non-volatile memory module device via an adaptor and instructions that register applications needing dedicated memory. In this manner, as discussed in greater detail later in this specification, embodiments of the present invention provide solutions for converting a volatile memory module device to a non-volatile memory module device without the use of flash memory.

A "memory module device", as used herein, refers generally, to a hardware storage device having one or more memory modules. For example, a memory module device can be a Single In-Line Memory Module (SIMM), a Dual In-Line Memory Module (DIMM), and/or other types of hardware storage devices having one or more memory modules, as will be appreciated by those of ordinary skill in the art.

Figure 1:
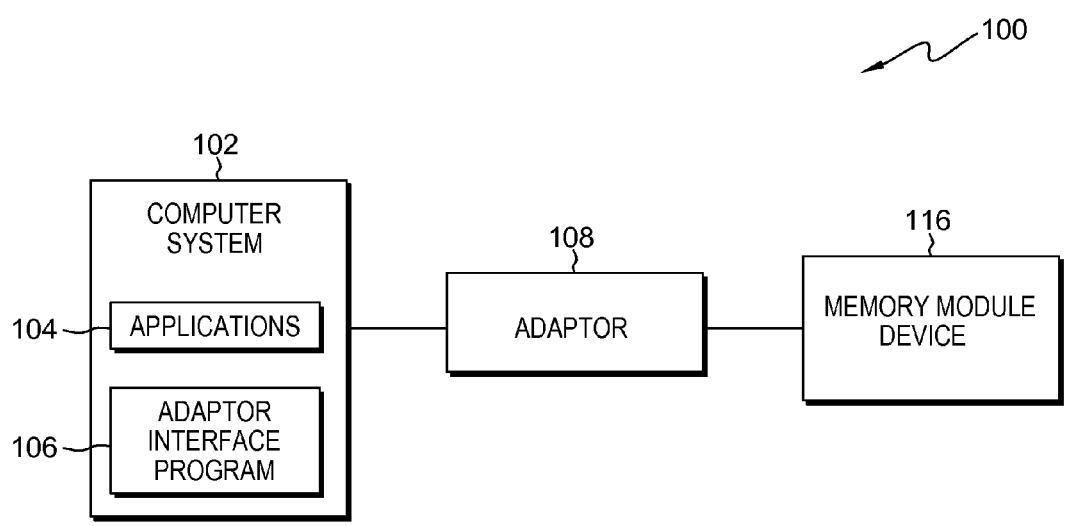
FIG. 1 is a block diagram of a memory module device adaptor system, in accordance with an embodiment of the present invention.

FIG. 1 is a block diagram of a memory module device adaptor system 100, in accordance with an embodiment of the present invention. Memory module device adaptor system 100 includes computer system 102, adaptor 108, and memory module device 116. Computer system 102 can be a desktop computer, laptop computer, specialized computer server, or any other computer system known in the art. In general, computer system 102 is representative of any electronic devices, or combination of electronic devices, capable of executing machine-readable program instructions, as described in greater detail with regard to FIG. 7.

Computer system 102 includes applications 104 and adaptor interface program 106. Applications 104 are one or more software programs capable of receiving inputs from a user of computer system 102 and transmitting received inputs via adaptor interface program 106, to memory module device 116. Applications 104 can be implemented with one or more computer programs that require dedicated memory. For example, applications 104 can be one or more graphic applications, video editing applications, text processing applications, spreadsheet processing applications, etc.

Adaptor interface program 106 manages data flow between an applications 104 and attached devices (e.g., adaptor 108 and memory module device 116). For example, adaptor interface program 106 can receive data from applications 104, assign registers to applications 104, create an application table, and manage memory recovery in the event of a power loss. An "application table", as used herein, refers to a table that stores application details (e.g., the application ID, the exit status, memory start address and memory end address for each of the applications on computer system 102).

Figure 4:
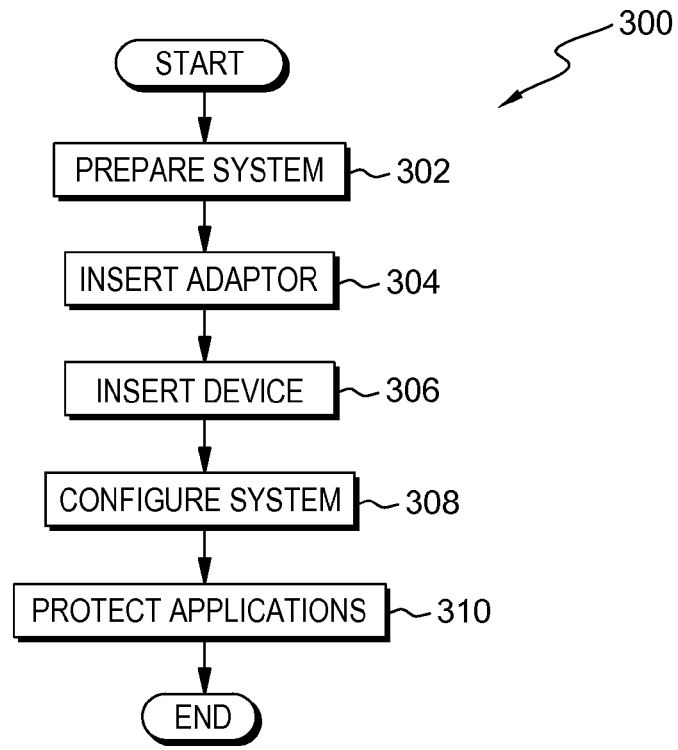
FIG. 4 is a flowchart illustrating operational steps for configuring a memory module device adaptor system to protect applications, in accordance with an embodiment of the present invention.
Figure 5:
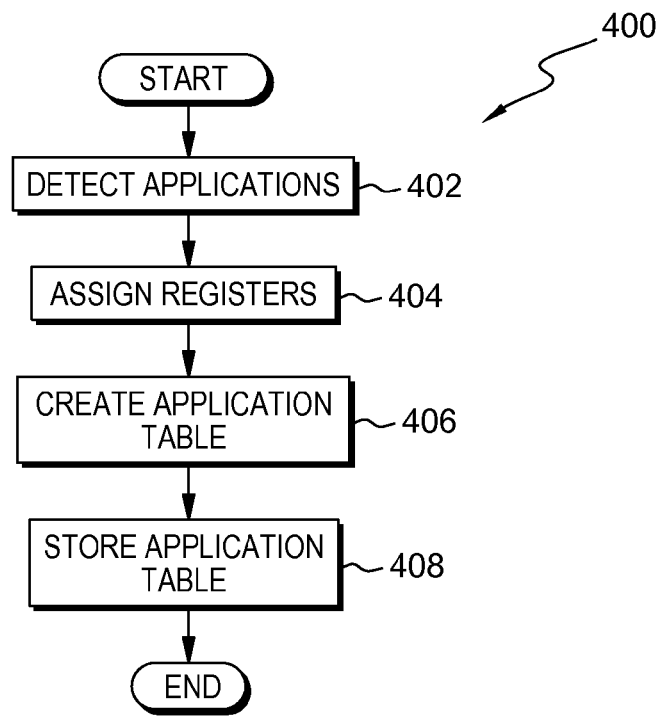
FIG. 5 is a flowchart illustrating operational steps for protecting applications, in accordance with an embodiment of the present invention.
Figure 6:
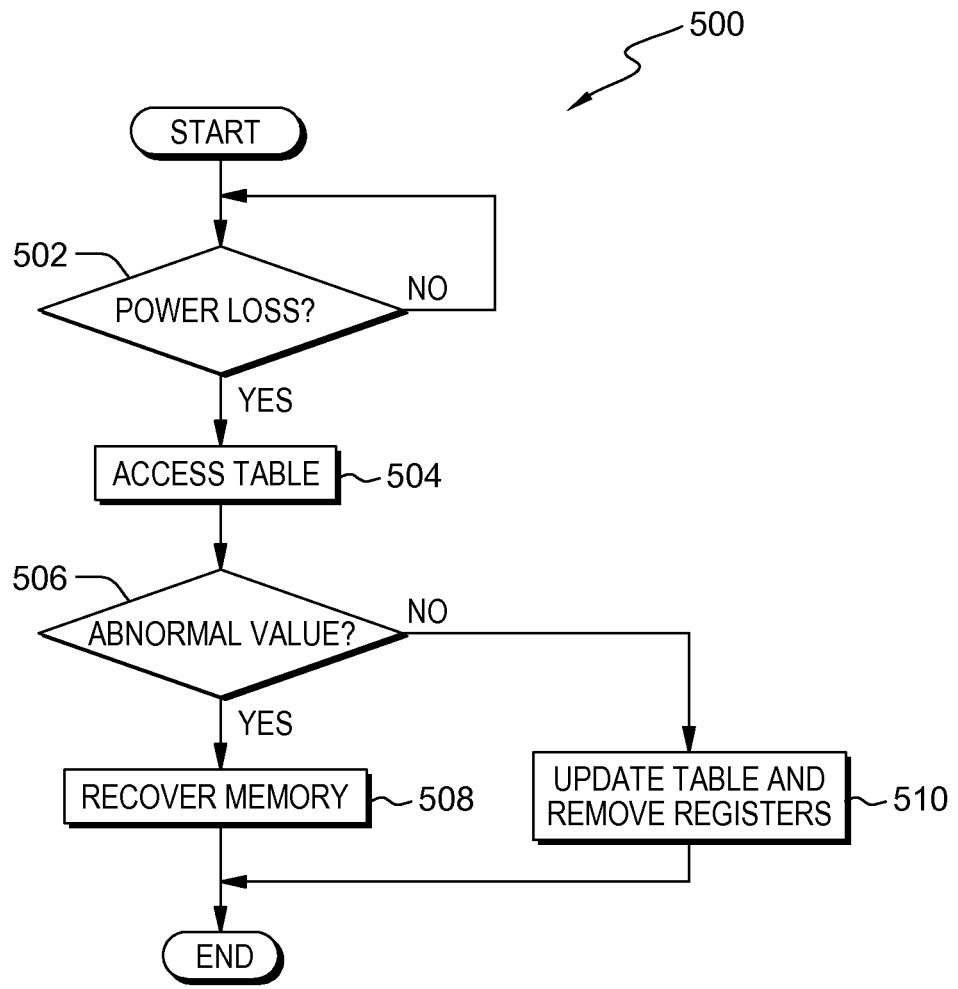
FIG. 6 is a flowchart illustrating operational steps for recovering memory, in accordance with an embodiment of the present invention.

Adaptor 108 connects to memory module device 116 and to computer system 102 and converts a volatile memory module device to a non-volatile memory module device, as discussed in greater detail with regard to FIGS. 4-6. In some embodiments, adaptor 108 can be an integrated, onboard component of computer system 102 (e.g., integrated into a motherboard). In other embodiments, adaptor 108 can be operatively connected to any apparatus that receives a memory module device (e.g., an application specific integrated circuit).

Memory module device 116 communicates with adaptor interface program 106 and facilitates access to memory modules located on memory module device 116. In this embodiment, memory module device 116 connects to adaptor 108 via pins, sockets, and locking mechanisms. Memory module device 116 comprises a circuit board that holds memory modules (not shown). In general, memory module device 116 can be implemented with any suitable type of memory, as will be appreciated by those of ordinary skill in the art. For example, memory module device 116 can be DDR1SDRAM, DDR2SDRAM, DDR3SDRAM, etc.

Figure 2A:
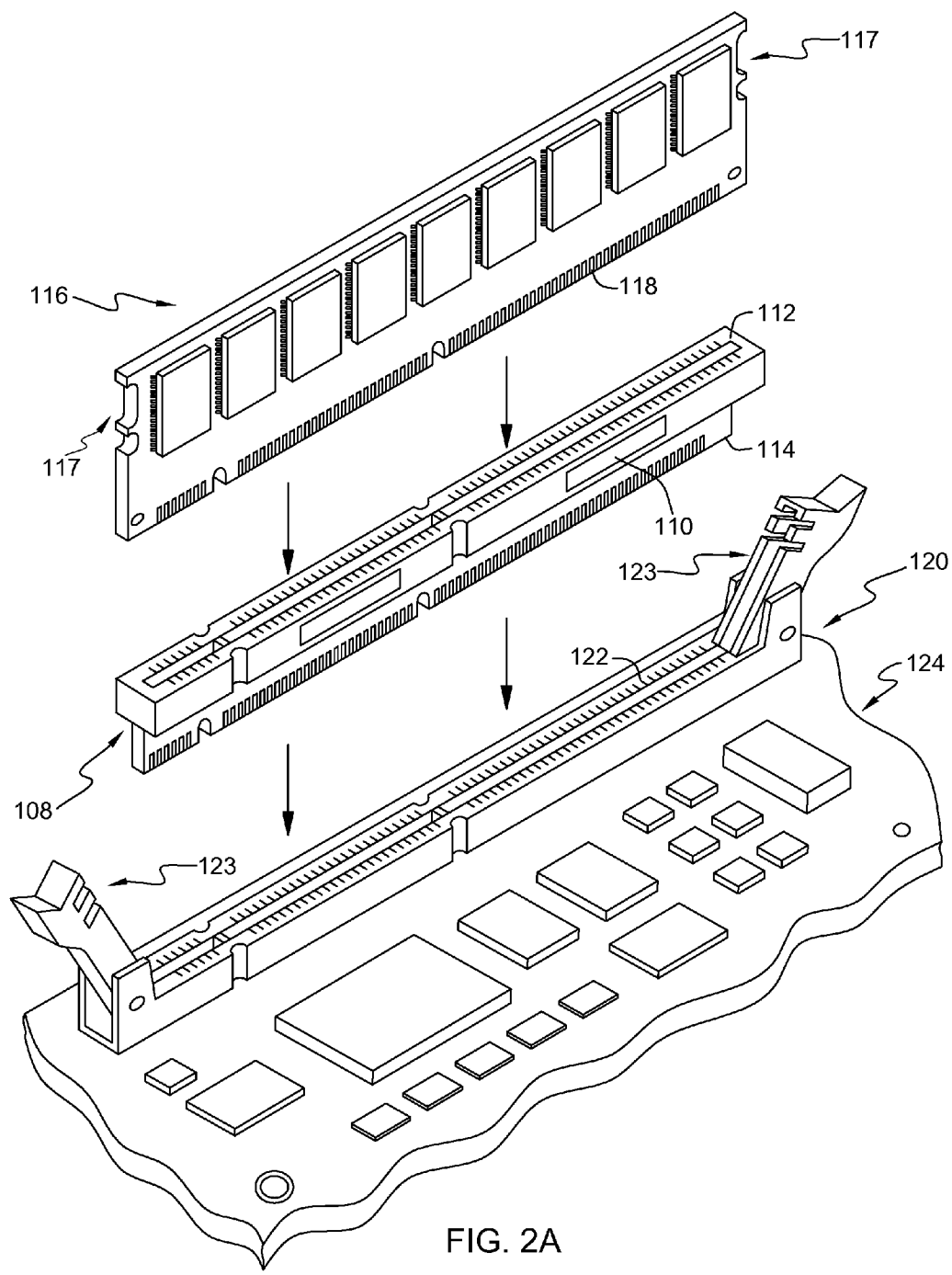
FIG. 2A is an exploded, perspective view of components of the memory module device adaptor system of FIG. 1, in accordance with an embodiment of the present invention.

FIG. 2A is an exploded, perspective view of certain components of memory module device adaptor system 100, in accordance with an embodiment of the present invention.

FIG. 2A shows memory module device 116 (e.g., a DIMM or a SIMM), adaptor 108, connecting mechanism 120, and motherboard 124 (i.e., disposed within computer system 102 of FIG. 1). Adaptor 108 is an elongated electronic circuit board that integrated circuits and other components can be attached to. Adaptor 108 includes memory module device sockets 112, male contact edge 114, and battery 110. In general, adaptor 108 can be made to any desired specification optimal to connect memory module device 116 to motherboard 124 (i.e., including any number of male and female connectors, pins, sockets, etc.).

Adaptor 108 includes memory module device sockets 112 (i.e., slots) along the length of the top edge of adaptor 108, into which male contact edge 118 of memory module device 116 is inserted. In this embodiment, memory module device 116 includes portions 117 that are engaged by latches 123 of connecting mechanism 120, as discussed below. In this embodiment, male contact edge 118 of memory module device 116 includes 184 pins, and memory module device sockets 112 include 184 pins (i.e., corresponding to the 184 pins of male contact edge 118). In other embodiments, memory module device sockets 112 can comprise 240 pins. Other embodiments of memory module device sockets 112 can comprise 288 pins. In general, memory module device sockets 112 can be made to any desired specification to receive male contact edge 118 of memory module device 116.

Adaptor 108 also includes male contact edge 114 along the bottom edge of adaptor 108, which is inserted into memory module device sockets 122 of connecting mechanism 120. In this embodiment, male contact edge 114 comprises 184 pins (i.e., corresponding to the 184 pins of memory module device sockets 122 of connecting mechanism 120). In other embodiments, male contact edge 114 can comprise 240 pins. Other embodiments of male contact edge 114 can comprise 288 pins. In general, male contact edge 114 can be made to any desired specification to insert into memory module device sockets 122 of connecting mechanism 120 of motherboard 124.

Adaptor 108 also includes battery 110, which supplies power to memory module device 116 in the event of a loss of power to computer system 102. In this embodiment, battery 110 is an integrated, onboard component of adaptor 108. In other embodiments, battery 110 can be separated from adaptor 108 and operatively connected to adaptor 108 via one or more cables and/or connectors. In some embodiments, battery 110 is a lithium ion cell. In some embodiments, battery 110 can be rechargeable and capable of receiving and storing energy from computer system 102. Battery 110 connects to power pins (see FIG. 3; not individually labeled in FIGS. 2A and 2B, and the location of which may change depending on type of memory module device 116) along adaptor 108. In this embodiment, diodes 115 (see FIG. 3) are used to prevent current from flowing from battery 110 to motherboard 124. In general, battery 110 acts as a power source to memory module device 116 and can be implemented with any power source that can provide power to memory module device 116.

Motherboard 124 includes connecting mechanism 120 which operatively couples adaptor 108 and memory module device 116 to motherboard 124. In this embodiment, memory module device sockets 122 receive male contact edge 114, and latches 123 secure memory module device 116 and adaptor 108 by engaging with portions 117 of memory module device 116. In general, connecting mechanism 120 can be an adaptor or any combination of hardware that facilitates connection of adaptor 108 to motherboard 124.

Figure 2B:
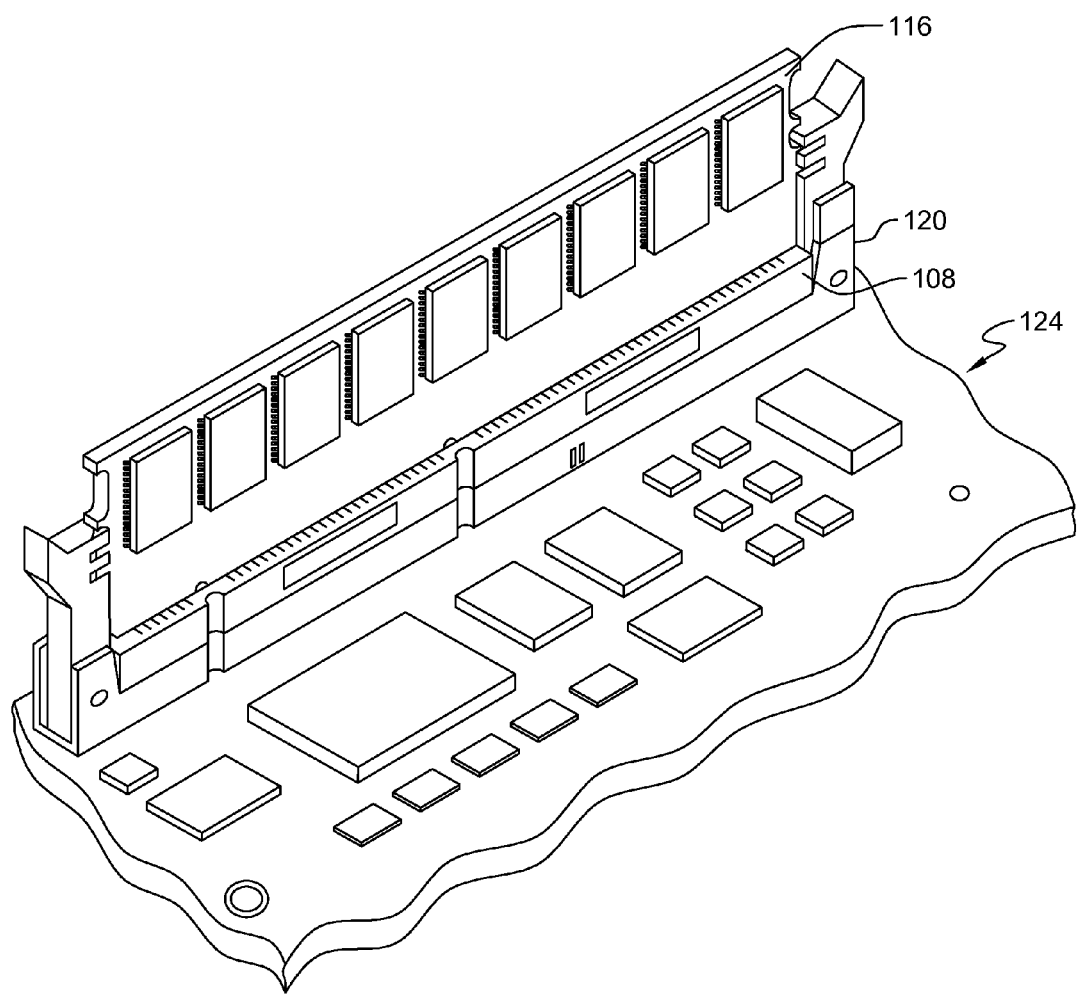
FIG. 2B is an assembled view of components of the memory module device adaptor system of FIG. 1, in accordance with an embodiment of the present invention.

FIG. 2B is an assembled view of certain components of memory module device adaptor system 100. For illustrative purposes, some elements of memory module device adaptor system 100 are not shown or labeled again in FIG. 2B. As shown, memory module device 116 is connected to adaptor 108, which is operatively coupled to motherboard 124 via connecting mechanism 120.

Figure 3:
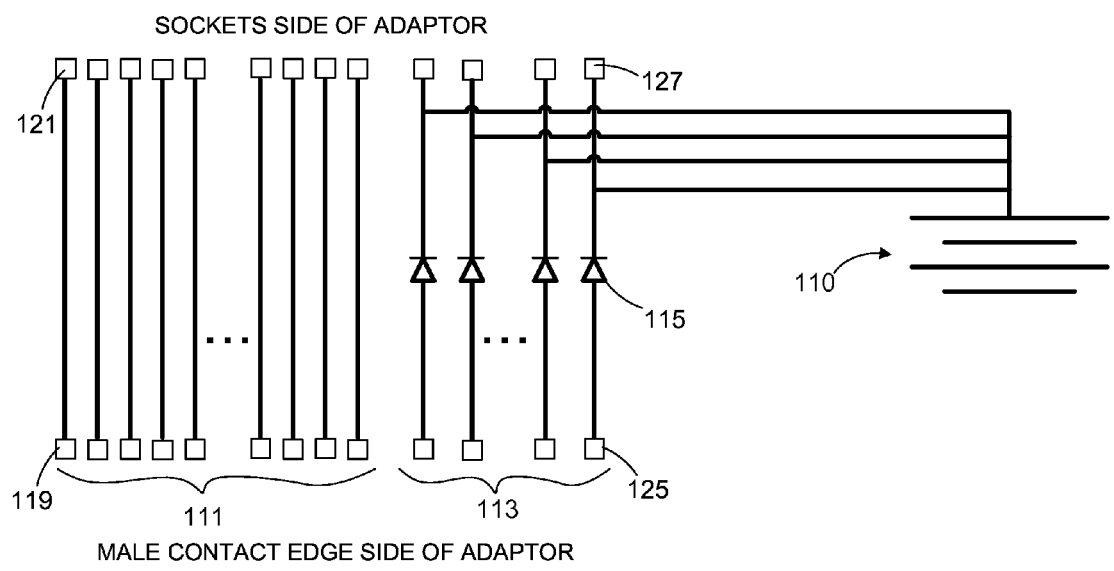
FIG. 3 is a schematic diagram showing a portion of a circuit that incorporates diodes, in accordance with an embodiment of the present invention.

FIG. 3 is a schematic diagram showing a portion of a circuit that incorporates diodes, in accordance with an embodiment of the present invention. In this embodiment, diodes 115 are made of doped silicon. As shown in FIG. 3, a plurality of non-power signals are transmitted through electrical connections 111 from a plurality of non-power pins 119 in male contact edge 114 to a plurality of non-power pins 121 in memory module device sockets 112. Power signals are transmitted through a plurality of electrical connections 113 from a plurality of power pins 125 in male contact edge 114 to a plurality of power pins 127 in memory module device sockets 112. Diodes 115 are disposed in the path of electrical connections 113, separating the portions of electrical connections 113 at which battery 110 is electrically connected from power pins 125 in male contact edge 114. In this embodiment, one side of diodes 115 are electrically connected to power pins 127, while the other side of diodes 115 are electrically connected to power pins 125. Accordingly, when male contact edge 118 is inserted into memory module device sockets 112, and male contact edge 114 is inserted into memory module device sockets 122, power applied from battery 110 to electrical connections 113 causes current to flow to power pins 127 in memory module device sockets 112 and provide power to memory module device 116, while diodes 115 prevent current from flowing backwards to power pins 125 in male contact edge 114, which in turn prevents current from flowing backwards into motherboard 124 (see FIGS. 2A and 2B).

FIG. 4 is a flowchart 300 illustrating operational steps for configuring a memory module device adaptor system to protect applications, in accordance with an embodiment of the present invention.

In step 302, computer system 102 is prepared. In this embodiment, computer system 102 is prepared by turning off computer system 102 and removing memory module device 116 (e.g., a DIMM or a SIMM). For example, a user of computer system 102 can initiate a shut-down of computer system 102, release latches 123, and remove memory module device 116 from computer system 102 by disconnecting male contact edge 118 from memory module device sockets 122 of connecting mechanism 120.

In step 304, adaptor 108 is inserted into connecting mechanism 120. In this embodiment, adaptor 108 is inserted into connecting mechanism 120 by inserting male contact edge 114 into memory module device sockets 122. In other embodiments, adaptor 108 can be inserted into motherboard 124 by operatively connecting adaptor 108 to motherboard 124 with any desired combination of fasteners and/or connectors.

In step 306, memory module device 116 is inserted into adaptor 108 by inserting male contact edge 118 into memory module device sockets 112 of adaptor 108. In other embodiments, memory module device 116 is inserted into adaptor 108 by operatively connecting memory module device 116 to adaptor 108 with any combination of fasteners and/or connectors. Similarly, memory module device 116 can be inserted into adaptor 108 before inserting adaptor 108 into connecting mechanism 120.

In step 308, computer system 102 is configured. In this embodiment, computer system 102 is configured by switching a BIOS switch to an "on" position (e.g., switching a specified bit "on"), which indicates to computer system 102 that adaptor 108 has been inserted and is ready for use to register one or more applications that use memory module device 116 to cache memory, as discussed in greater detail with regard to FIGS. 5-6.

In step 310, adaptor 108 protects applications 104 in the event of a failure. In this embodiment, adaptor 108 provides power to memory module device 116 and calls adaptor interface program 106 to protect applications (e.g., applications 104) and recover memory in the event of a system failure, as discussed in greater detail with regard to FIG. 6. A "system failure" as used herein, can be any abnormal termination, interruption, or error in software and/or hardware in computer system 102 or another memory module device adaptor system 100 that affects access to computer system 102 or another component of memory module device adaptor system 100.

FIG. 5 is a flowchart 400 illustrating operational steps for protecting applications, in accordance with an embodiment of the present invention. For example, the operational steps of flowchart 400 can be performed at step 310 of flowchart 300.

In step 402, adaptor interface program 106 detects applications. In this embodiment, adaptor interface program 106 receives a registration request from each of applications 104, which allows adaptor interface program 106 to detect their presence. For example, a text processing program of applications 104 can send a request to adaptor interface program 106. In other embodiments, adaptor interface program 106 can receive a registration request from one or more other components of memory module device adaptor system 100.

In step 404, adaptor interface program 106 assigns registers to each of applications 104 that sent a registration request to adaptor interface program 106. In this embodiment, adaptor interface program 106 assigns four registers for every registered application. The first register stores the application name and version. The second register reflects the latest exit status of the application. In this embodiment, an exit status can be "Normal" or "Abnormal". An exit status can be reported as Normal if the application terminates according to its standard shut-down protocols. Conversely, an exit status can be reported as Abnormal if an error occurs during shut-down protocols of the application. The third and fourth registers store the memory start address and memory end address, respectively. For example, adaptor interface program 106 can assign four registers to a text processing program of applications 104 responsive to receiving a registration request from the text processing program. The first register may store an application name and version of TP version 1. The second register may store a latest exit status of Normal. The third register may store a memory start address of 0xC4000000. The fourth register may store a memory end address of 0xC4FFFFFF.

In step 406, adaptor interface program 106 generates an application table for registered applications. In this embodiment, the application table for registered applications comprises address entries for each of the four assigned registers for every registered application of applications 104. For example, the application table can store two registered applications, applications A and B, respectively. Each application has four addresses assigned for each registered application. The first address, "Address 0" can store the application ID for application A. The second address, "Address 1", can store the exit status for Application A. The third address, "Address 3", can store the memory start address for application A. The fourth address, "Address 4", can store the memory end address for application A. Similarly, addresses 5-7 store entries for application B.

In step 408, adaptor interface program 106 stores and updates the generated application table. In this embodiment, adaptor interface program 106 stores the generated application table in a repository. The repository may be implemented with any suitable storage architecture known in the art. In this embodiment, adaptor interface program 106 updates the generated application table by receiving one or more values for memory start and memory end addresses from each of the registered applications of applications 104. In other embodiments, adaptor interface program 106 can query the registered applications of applications 104 pursuant to a schedule for updated values for memory start and end addresses.

Accordingly, in this embodiment, an application table is generated that can be used to recover memory of registered applications in the event of a system failure.

FIG. 6 is a flowchart 500 illustrating operational steps for recovering memory, in accordance with an embodiment of the present invention.

In step 502, adaptor interface program 106 determines whether computer system 102 has experienced a power loss. In this embodiment, adaptor interface program 106 detects an AC input voltage that provides the main power supply to computer system 102 is below an acceptable level which signifies that computer system 102 has experienced a power loss. In other embodiments, adaptor interface program 106 can receive an indication from one or more other components of memory module device adaptor system 100 that computer system 102 is transitioning to a volatile state.

If, in step 502, adaptor interface program 106 determines that computer system 102 has not experienced a power loss, then processing repeats until adaptor interface program 106 determines that computer system 102 has experienced a power loss at step 502, as previously discussed.

If, in step 502, adaptor interface program 106 determines that computer system 102 has experienced a power loss, then in step 504, adaptor interface program 106 accesses the generated application table to determine whether there is an abnormal exit for each of the registered applications of applications 104. In this embodiment, adaptor interface program 106 determines that an abnormal exit by reading the second register assigned to each registered application of applications 104. For example, responsive to determining computer system 102 experienced a power loss, adaptor interface program 106 accesses the application table and reads the entry that corresponds to the second register (i.e., the register that stores the value for exit status of an application) assigned to application A.

If, in step 506, adaptor interface program 106 determines that there is an abnormal exit for one or more of the registered applications of applications 104, then, in step 506, adaptor interface program 106 recovers stored memory for registered applications of applications 104 that had an abnormal exit status. In this embodiment, adaptor interface program 106 recovers memory by accessing the generated application table, reading the entries for the third and fourth register (i.e., the memory start and end addresses for the registered application), and initializing application memory (e.g., the operational state of a registered application of applications 104) with these two values. For example, responsive to determining that there is an abnormal exit for application A, adaptor interface program 106 can access the application table and read the entries for the third and fourth register. Using the values for the third and fourth register, adaptor interface program 106 can restore the status of application A from the last invocation before the power loss.

If, in step 506, adaptor interface program 106 determines that there is not an abnormal exit for one or more of the registered applications of applications 104, then, in step 508, adaptor interface program 106 updates the application table by removing previous memory start and end address from the third and fourth register, and updating the values for the third and fourth register as the applications starts.

Accordingly, embodiments of the present invention can be used to convert a volatile memory module device to a non-volatile memory module device via an adaptor, without the use of a flash module. In the event of a system failure, such as one caused by power loss, data that applications may otherwise lose can be stored and recovered. Providing a non-volatile memory module device without the use of a flash module can be a less costly alternative to a non-volatile memory module device that uses a flash module.

Figure 7:
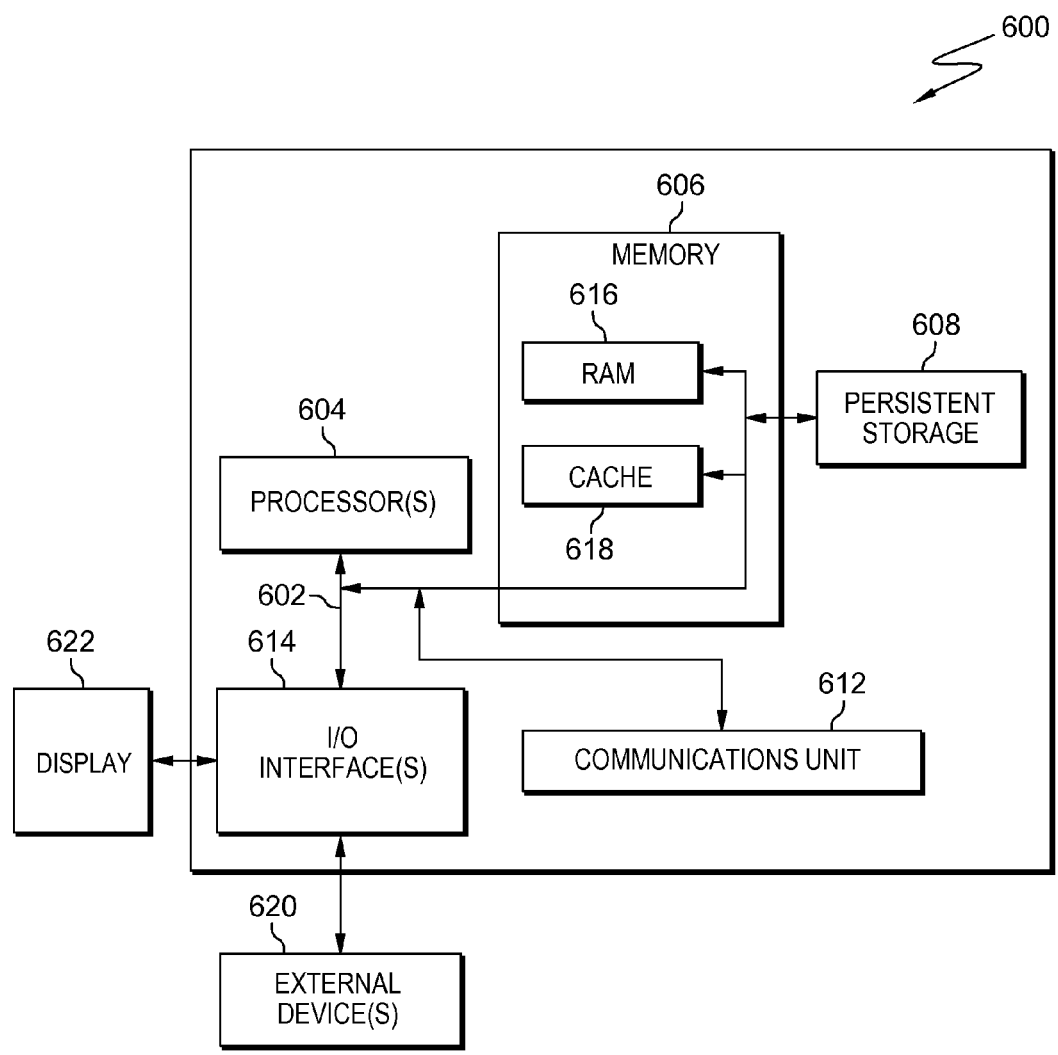
FIG. 7 is a block diagram of internal and external components of the computer systems of FIG. 1, in accordance with an embodiment of the present invention.

FIG. 7 is a block diagram of internal and external components of computer system 600, which is representative of the computer systems and switches of FIG. 1, in accordance with an embodiment of the present invention. It should be appreciated that FIG. 7 provides only an illustration of one implementation and does not imply any limitations with regard to the environments in which different embodiments may be implemented. In general, the components illustrated in FIG. 7 are representative of any electronic device capable of executing machine-readable program instructions. Examples of computer systems, environments, and/or configurations that may be represented by the components illustrated in FIG. 7 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 600 includes communications fabric 602, which provides for communications between one or more processors 604, memory 606, persistent storage 608, communications unit 612, and one or more input/output (I/O) interfaces 614. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 616 and cache memory 618. In general, memory 606 can include any suitable volatile or non-volatile computer-readable storage media. Software is stored in persistent storage 608 for execution and/or access by one or more of the respective processors 604 via one or more memories of memory 606.

Persistent storage 608 may include, for example, a plurality of magnetic hard disk drives. Alternatively, or in addition to magnetic hard disk drives, persistent storage 608 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 608 can also be removable. For example, a removable hard drive can be used for persistent storage 608. Other examples include optical and magnetic disks, thumb drives, and smart cards that are inserted into a drive for transfer onto another computer-readable storage medium that is also part of persistent storage 608.

Communications unit 612 provides for communications with other computer systems or devices via a network. In this exemplary embodiment, communications unit 612 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded to computer system 102 through communications unit 612 (e.g., via the Internet, a local area network or other wide area network). From communications unit 612, the software and data can be loaded onto persistent storage 608.

One or more I/O interfaces 614 allow for input and output of data with other devices that may be connected to computer system 600. For example, I/O interface 614 can provide a connection to one or more external devices 620 such as a keyboard, computer mouse, touch screen, virtual keyboard, touch pad, pointing device, or other human interface devices. External devices 620 can also include portable computer-readable storage media such as, for example, thumb drives, portable optical or magnetic disks, and memory cards. I/O interface 614 also connects to display 622.

Display 622 provides a mechanism to display data to a user and can be, for example, a computer monitor. Display 622 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. An apparatus, comprising:
a memory module device adaptor having a first memory module device socket and a first male contact edge, wherein the first memory module device socket is configured to receive a male contact edge of a memory module device, and the first male contact edge is configured to be inserted into a second memory module device socket;
a battery operatively connected to one or more power pins of the first memory module device socket, wherein the battery is configured to provide power to a memory module device received in the first memory module device socket; and
one or more diodes operatively connected to the one or more power pins of the first memory module device socket and one or more power pins of the first male contact edge, wherein the one or more diodes are configured to prevent current from flowing from the battery to the one or more power pins of the first male contact edge.

2. The apparatus of claim 1, wherein the memory module device is a Dual In-line Memory Module (DIMM).

3. The apparatus of claim 1, further comprising:
a computer system operatively connected to the memory module device adaptor, the computer system configured to recover data stored on the memory module device in the event of a system failure.

4. The apparatus of claim 3, wherein the second memory module device socket is disposed on a motherboard of the computer system.

5. The apparatus of claim 3, wherein the computer system is further configured to:
receive a registration request from one or more applications;
responsive to receiving a registration request, register the one or more applications; and
generate an application table, wherein the application table stores information about the registered one or more applications.

6. The apparatus of claim 5, wherein the stored information about each of the one or more registered applications comprises an application name and version, and memory start and memory end addresses.

7. The apparatus of claim 6, wherein the computer system is further configured to:
responsive to determining that the computer system has experienced a power loss, determine whether one or more registered applications had an abnormal exit; and
responsive to determining that one or more registered applications had an abnormal exit, recover data of the one or more registered application that had an abnormal exit from the memory module device.

8. The apparatus of claim 7, wherein the computer system is configured to recover data by:
accessing the generated application table;
reading the memory start and end addresses for each of the one or more registered applications; and
recovering from the memory module device data associated with the memory start and end addresses for each of the registered applications.

9. The apparatus of claim 7, wherein the computer system is further configured to:
responsive to determining that one or more registered applications had an normal exit, update the generated application table.

10. The apparatus of claim 8, wherein the computer system is configured to update the generated application table by:
removing respective memory start and end address associated with applications that had a normal exit.

11. A method, comprising:
inserting a male contact edge of a memory module device into a first memory module device socket of a memory module device adaptor, the memory module device adaptor having a first male contact edge;
inserting a male contact edge of the memory module device adaptor into a second memory module device socket; and
providing power from a battery to the memory module device, wherein:
the battery is operatively connected to one or more power pins of the first memory module device socket; and
one or more diodes are operatively connected to the one or more power pins of the first memory module device socket and one or more power pins of the male contact edge of the memory module device adaptor to prevent current from flowing from the battery to the one or more power pins of the male contact edge of the memory module device adaptor.

12. The method of claim 11, wherein the memory module device is a Dual In-line Memory Module (DIMM).

13. The method of claim 11, further comprising:
a computer system recovering data stored on the memory module device in the event of a system failure, wherein the computer system is operatively connected to the memory module device adaptor.

14. The method of claim 13, wherein the second memory module device socket is disposed on a motherboard of the computer system.

15. The method of claim 13, further comprising:
the computer system receiving a registration request from one or more applications;
responsive to receiving a registration request, the computer system registering the one or more applications; and
the computer system generating an application table, wherein the application table stores information about the registered one or more applications.

16. The method of claim 15, wherein the stored information about each of the one or more registered applications comprises an application name and version, and memory start and memory end addresses.

17. The method of claim 16, further comprising:
responsive to determining that the computer system has experienced a power loss, the computer system determining whether one or more registered applications had an abnormal exit; and responsive to determining that one or more registered applications had an abnormal exit, the computer system recovering data of the one or more registered application that had an abnormal exit from the memory module device.

18. The method of claim 17, wherein recovering data stored on the memory module device comprises:
the computer system accessing the generated application table;
the computer system reading the memory start and end addresses for each of the one or more registered applications; and
the computer system recovering from the memory module device data associated with the memory start and end addresses for each of the registered applications.

19. The method of claim 17, further comprising:
responsive to determining that one or more registered applications had an normal exit, updating the generated application table.

20. The method of claim 18, further comprising:
the computer system updating the generated application table by removing respective memory start and end address associated with applications that had a normal exit.

* * * * *